United States Patent [19]

Frost et al.

[11] 4,326,439
[45] Apr. 27, 1982

[54] APPARATUS AND METHOD FOR STACKING AND FACING UNCURED BRICK

[75] Inventors: Bob L. Frost; Harry D. Leeds; Joseph E. Eckart, all of Clarksville, Ark.

[73] Assignee: Clarksville Machine Works, Inc., Clarksville, Ark.

[21] Appl. No.: 134,025

[22] Filed: Mar. 26, 1980

[51] Int. Cl.³ .............................................. B28B 13/00
[52] U.S. Cl. ........................................ 83/27; 83/90; 83/425.2; 83/651.1; 198/419; 198/422; 414/56
[58] Field of Search .................. 83/23, 27, 86, 90, 91, 83/425.2, 651.1; 414/46, 33, 56, 89; 198/419, 422, 403

[56] References Cited

U.S. PATENT DOCUMENTS

| Re. 28,160 | 9/1974 | Lingl | 414/56 X |
|---|---|---|---|
| 2,917,991 | 12/1959 | Segur | 198/422 X |
| 3,250,376 | 5/1966 | Griner et al. | 198/419 |
| 3,352,435 | 11/1967 | Reinecke | 198/419 X |
| 3,589,495 | 6/1971 | Pearne | 414/55 X |
| 4,161,368 | 7/1979 | Batzdorff | 414/34 X |

Primary Examiner—James M. Meister

Attorney, Agent, or Firm—Charles R. Rhodes; Judith G. Smith

[57] ABSTRACT

Each row of uncured brick is arranged with a longitudinal axis extending transversely across the width of a push-off table and is serially pushed by preceding rows past the end of the table. An elevator device registers a first platform with the end of the push-off table to receive a first row(s) and a second platform vertically spaced therefrom to receive a second row(s). The upper and lower row(s) are then simultaneously pushed from the elevator onto the upstream end of a marshalling table to form a two layer stack. A first shuttle device includes a plurality of shorter, longitudinally extending bars interspersed between the bars forming the marshalling table. The bars of the shuttle device are vertically movable between a first position beneath the level of the marshalling table bars, and a second position above such level supporting the bricks thereon. Further, the shuttle device is movable longitudinally of the entire conveying system to bring the two layer stack of bricks into registration beneath a facer. The facer lifts the top layer, inverts it, and replaces it on the lower layer. The faced, double layer rows are then moved to a position to be moved by a puller bar into position beneath the setting machine head.

10 Claims, 13 Drawing Figures

APPARATUS AND METHOD FOR STACKING AND FACING UNCURED BRICK

BACKGROUND OF THE INVENTION

There are basically two procedures by which bricks are formed from clay into individual cut bricks and delivered to a setting head for emplacement on a kiln car. In the first method, at the pug mill a continuous slab of clay having cross-sectional dimensions equal to the length and width of a brick are continuously extruded therefrom. As the clay slab is extruded a rotating wire cuts the clay into individual bricks. The bricks then move down an off-bearing conveyor to the end thereof where they are assembled into rows of a desired number therein and pushed transversely onto a marshalling table. On the marshalling table the rows of bricks are stacked into double layers with the upper layer being inverted in an operation called "facing". The double layer rows are then assembled and delivered by some type of setter head onto a kiln car.

In the second procedure, clay slugs are extruded and cut to a prescribed length. The slugs proceed down a conveyor where they are stacked, one on top of the other, then pushed through a wire cutter onto a marshalling or spread table. As the slugs are passed through the wire cutter each slug is cut into a row of bricks and delivered onto a spread table. As a plurality of rows of brick accumulated on the spread table, a setter head will lift and transfer three or four double-layer rows onto a kiln car. One example of such a system is basically described in the Pearne et al U.S. Pat. No. 3,589,495.

In either system, regardless of the manner in which the bricks are cut, it is necessary to perform two operations. First of all, either the slugs or the cut rows of brick must be stacked into double-layer rows or groups of rows called "courses", as this is the manner in which they are transferred to the kiln car. Secondly, the upper layer of each row must be inverted in an operation called "facing" to protect the finished side of the bricks as they are fired.

In the aforementioned Pearne et al patent it is noted that the row slugs are stacked and faced, then pushed through a wire cutter to form the individual bricks. It has been found that pushing a double layer slug through a wire cutter will cause distortion in the edge of the bricks, as it is difficult to push that size and weight of clay successfully through the wire while making a clean cut. It would be preferable, as a result, to push only a single layer row of bricks through wire cutters then perform the stacking and facing operation afterwards. Therefore, there is a need for a system for stacking and facing cut rows of bricks subsequent to the cutting operation and prior to delivery to the setter head.

Secondly, where single rows are to be stacked and inverted simultaneously, single rows must be shuttled or conveyed to a position spaced from the succeeding rows on the push-off table to give the apparatus room to operate. To continuously stop successive rows at the same point to form double layer stacks is a difficult operation in conveying techniques.

Other examples of prior art which recognize the need for facing and the desirability of stacking double layer courses on kiln cars include: U.S. Pat. No. 1,413,402 to Hanley, Jr. which shows in FIG. 7 that courses may be inverted during the stacking thereof on kiln cars by a mechanism including a hoist and a detachable frame. In this patent an entire course is lifted, inverted and stacked together, rather than stacking and facing rows prior to the formation of entire courses (which include a plurality of rows).

In U.S. Pat. No. 2,955,717 to Segur et al rows of cut brick are formed and introduced to a grouping table on a pair of conveyors. A row of bricks is lifted from one incoming conveyor, inverted 180° and set down on a second row of bricks which has been delivered by the other incoming conveyor. To lift a row of bricks from one conveyor, swing it through an arc of 180° and deposit it on a second row of bricks which has been introduced from an entirely second conveyor involves the coordination and registration of several pieces of equipment which is very difficult, expensive and relatively unreliable. A close look at FIG. 15 of this patent will indicate the intricacy necessary to successfully perform this operation.

In U.S. Pat. No. 2,917,991 to Segur, bricks or rows of bricks are introduced on an inclined conveyor. An elevator lifts alternating rows, delivers them into a flip-over device 36, which flips over the elevated row and redeposits it on a preceedingly formed lower row.

SUMMARY OF THE PRESENT INVENTION

The present invention is directed to a different approach for stacking and facing uncured brick. The operation of stacking and facing in this invention occurs between the time the bricks are cut from slugs into single layer rows and the time they are lifted to be placed on the kiln car.

In its broadest aspect the technique involves delivering single rows of bricks from a push-off table into an elevator means having a first platform onto which a first row(s) of bricks are moved and a second platform in vertical spaced relation to the first platform onto which a second row(s) of bricks are placed. The elevator includes means associated therewith for moving the two platforms back and forth between a first vertical position in which the first platform is aligned with and receives the first row(s) of bricks and a second vertical position in which the second platform is aligned with and receives the second row(s) of bricks. Downstream of the elevator is a marshalling table for receiving the double row stack of bricks which are pushed from the elevator thereonto. The marshalling table includes a first shuttle means for moving bricks from the upstream end of the marshalling table to a second position in registry and aligned with an inverter or facer head. The facer head lifts and inverts the upper layer of the double layer stack and deposits this layer onto the lower layer in a faced condition. Then a second shuttle removes the faced double layer stack out of position beneath the facer and into a second position for movement to a pickup point beneath a setting head. Meanwhile the first shuttle is delivering a new double layer stack of bricks into position beneath the facer.

The elevator itself includes a pair of spaced platforms and a lift means for alternately raising and lowering the platforms to bring them alternately into registry with the push-off table. As incoming bricks push the lower row of bricks out of the lower platform, an auxiliary pusher device pushes the upper layer bricks off the upper platform and onto the lower row of bricks. Both layers are then in position on the front end of the marshalling table.

In a preferred embodiment the marshalling table includes a plurality of longitudinally extending, transversely spaced support bars onto which the bricks are initially placed. The first or stacker shuttle includes also a plurality of horizontally spaced bars interspersed in the spaces between the aforementioned bars of the marshalling table, however, much shorter. The stacker shuttle also includes a lifting means for raising the shuttle bars as a group from a position slightly beneath the level of the marshalling table bars to a position slightly above. The shuttle is also provided with means for moving the entire assembly longitudinally of the table on a set of wheels to bring the bricks supported thereon into registry beneath the facer. Once the bricks are emplaced beneath the facer, the shuttle bars are lowered and the shuttle moves back to its first position. A second facer shuttle similar to the first and working simultaneously therewith moves the faced stack into position for pick-up by a puller bar once the facing is done.

The present invention differs from prior approaches in that it provides a simple but very effective technique for taking successive, single layer rows of bricks after being cut by a push-through cutter, stacking those rows into double layer stacks, then inverting the upper layer to accomplish the facing operation.

It is therefore an object of the present invention to provide an improved method and apparatus for stacking and facing uncured brick.

It is another object of the present invention to provide an improved method and apparatus of the type described which is highly effective and very simple, yet maintains more complete control over the positioning of the bricks at all times than with previous devices.

BRIEF DESCRIPTION OF THE DRAWINGS

FIG. 3 is an enlarged perspective view with parts broken away, illustrating the elevator device alone with portions of the slide table and marshalling table shown dotted in.

DETAILED DESCRIPTION OF A PREFERRED EMBODIMENT

Figure 1:
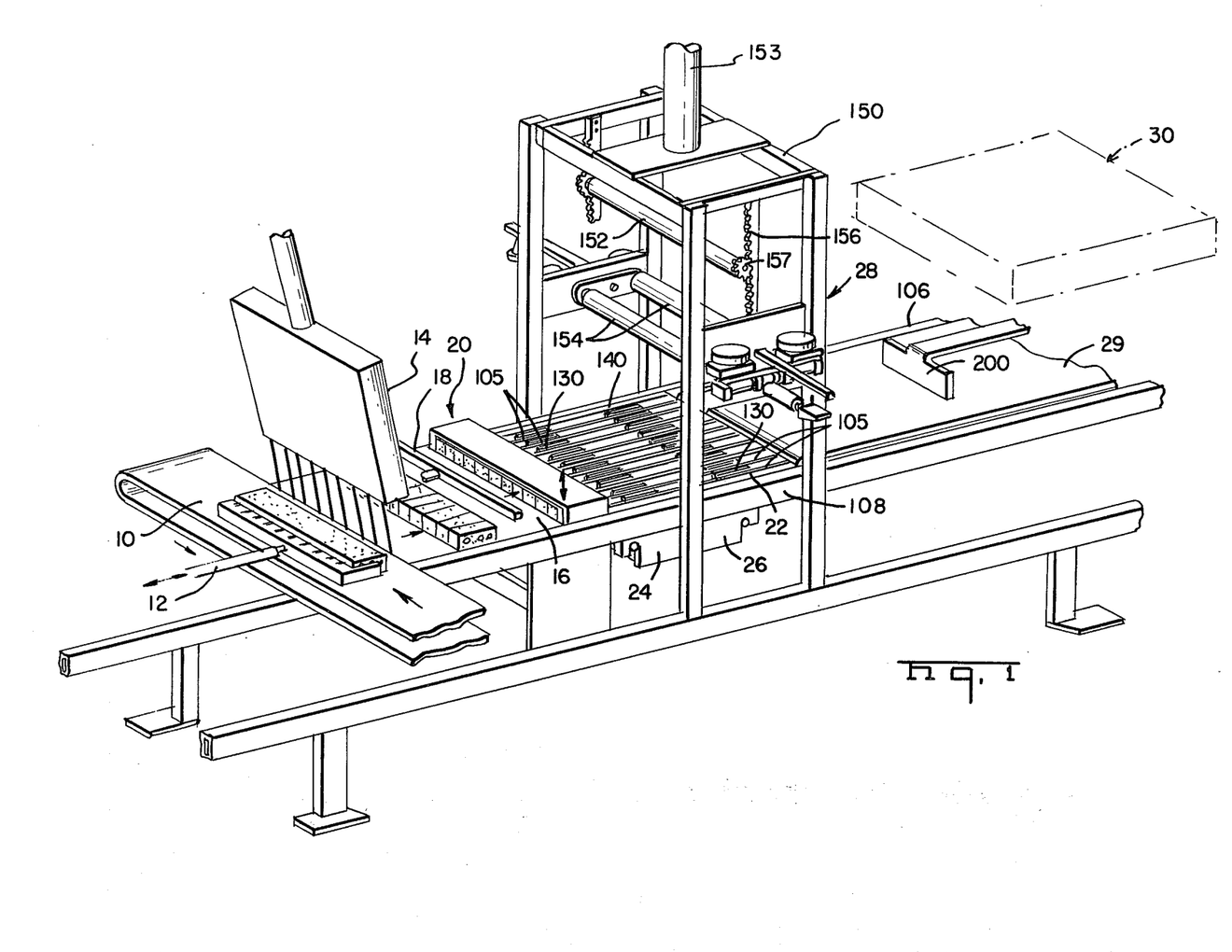
FIG. 1 is a perspective view illustrating the apparatus according to the present invention while in a first mode.
Figure 2:
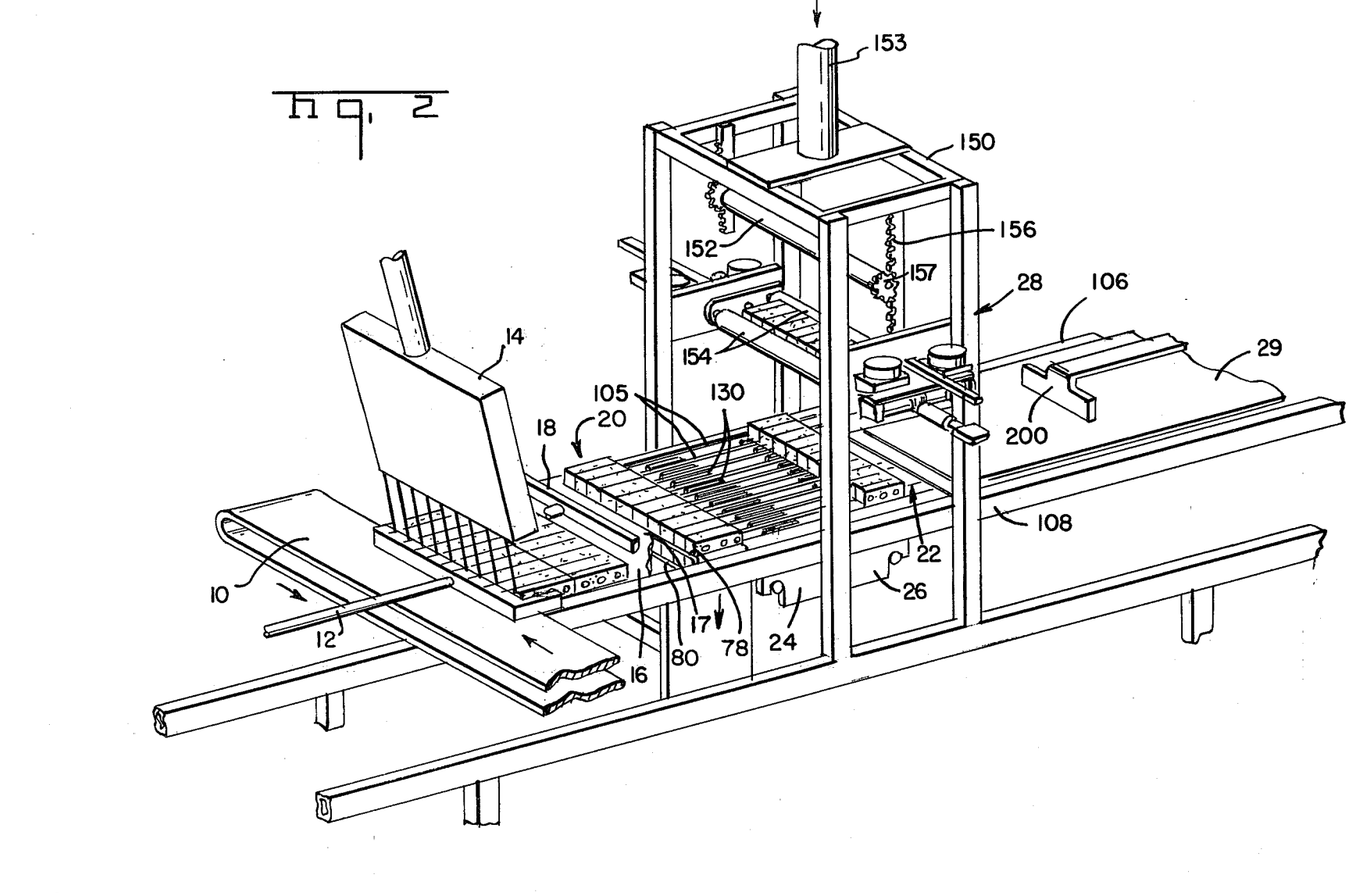
FIG. 2 is a perspective view similar to FIG. 1, except illustrating the apparatus in a second mode.

Turning now to the drawings, and particularly to FIGS. 1 and 2 there is illustrated the overall apparatus according to the present invention. By way of orientation in the system, slugs S of brick are formed in an extruder (not shown), cut to a length approximating a row of bricks to be processed, and processed along an off-bearing conveyor 10. As each slug S reaches the end of the off-bearing conveyor 10, it is stopped and moved transversely by means of a push-off device 12 onto the front end of a push-off table 16. At this stage the slugs are arranged transversely of the push-off table 16 with the side edge of each slug being up against the side edge of the adjacent preceding and succeeding slugs, so that the slugs proceed sidewise along the push-off table as the push-off device 12 pushes the ensuing slugs onto the front end of the table 16.

As the slugs are pushed past a wire cutting frame 14, the slugs are cut into rows of individual bricks in a well known and conventional fashion. The details of the cutter need not be described herein because they are well known in the art. The clay slugs have now been processed so that they are in the form of rows of individual bricks. The rows extend transversely across the push-off table 16. At this point the apparatus and method of the present invention come into play.

As the rows R of bricks are pushed one at a time past the terminal end 17 of push-off table 16, they are positioned on one of two platforms in an elevator means 20. In this regard, a first row of bricks is moved onto a first platform. A second row of bricks is then moved onto a second platform spaced vertically above the first platform after the elevator has lowered the first platform to a level below the push-off table 16.

A transfer means, which includes the aforementioned push-off device 12 and a second or auxiliary pusher 18, simultaneously moves both rows of bricks from the elevator means 20 onto the upstream or front end of a marshalling table 22. As the bricks are moved onto the table the upper row becomes removed from the upper platform and is positioned or rests on the lower row to form a double layer row or stack. At this time it should be noted that the word "rows" as used herein may mean a single column of bricks formed by a single slug, or it may mean two or more columns arranged in side-by-side relation as will be shown in FIG. 7 and described in connection therewith. In other words, the elevator 20 and inverter 28 are able to handle more than one row at a time in each layer of the stack.

Once the double-row layer is emplaced on the front end of the marshalling table 22, a first shuttle means 24 transfers the double row stack from the upstream end of the marshalling table 22 to a second position beneath the inverter head 28. Once the inverting process is completed the double layer stack of bricks is then moved from beneath the inverter head 28 by a second shuttle 26 which delivers the double layer, faced stack to the setting table 29 for operation by the setting head 30. Both the setting table 29 and setting head 30 may be of various conventional types, and neither the setting table 29 nor the setting head 30 form a part of this invention.

ELEVATOR/STACKER ASSEMBLY

Turning now to FIG. 3 there is illustrated a perspective view of the elevator means 20 which is supported between side rails 108. These side rails extend along the entire system from the push-off table 16 on past the elevator means 20, the inverter head 28 and into the setting table 29. An L-shaped side plate 40 is attached by a pair of rollers 42,44 to each side rail 108 and is generally stationary with the exception of a slight longitudinal movement between a first position where the platforms of the elevator are snug up against push-off table 12 and a second position where the platforms of the elevator are snug against the front end of the marshalling table 22. This distance of movement is only approximately one inch and merely provides a spacing between the bricks on the platforms and the bricks coming down the push-off table 12. Thus, when the elevator moves up and down there is no rubbing between the rear edges of the bricks on the elevator and the forward edges of the first row on the push-off table 12. The aforementioned longitudinal movement is provided by a shifting means in the form of a pair of hydraulic cylinders 46 having one end secured to a permanent portion of the system framework 48, and the free end of the piston of the cylinder attached to a horizontal bar 50 which extends between the two side plates 40.

Side brackets 40 further includes a toothed rack 52 extending vertically up one side thereof for the purpose of stabilizing the vertically movable housing 60 during raising and lowering as will be described in more detail hereinafter. A pair of bumpers 54 are adjustably mounted on an upstanding plate 56 atop one of the brackets 40 to provide an upper limit to the travel of the elevator as it moves up and down between the two brackets 40. Various other stabilizing bars and rollers may be provided as necessary to ensure proper vertical movement.

Vertically movable housing 60 is attached for vertical reciprocatory movement between the two side brackets 40. Housing 60 includes a pair of spaced support plates 62. Along one vertical side of the support plate, a lug 64 extends outwardly therefrom. A lifting means includes a flexible connecting member, such as chain 66 which extends upwardly from lug 64 around a support bearing 68, and is attached to the piston 70 of a linear actuator, in this case a hydraulic cylinder 72. A gear 74 is supported for rotation by a bracket 76 extending outwardly from the opposite edge of the plate 62. The gear is maintained in engagement with rack 52 for stabilizing the vertical movement of the housing 60 responsive to horizontal movement of the piston 70 of hydraulic cylinder 72. Although only one side of housing 60 has been shown, a similar plate 62 and hydraulic cylinder 72 arrangement is attached to the opposite side so that the movement is equalized. Thus it can be seen that as the hydraulic cylinder is activated, housing 60 is caused to move up and down in a very controlled path.

In order to provide the desired stacking arrangement a pair of platforms 78,80 extend between and are supported by side plates 62. In FIG. 3 the elevator is shown in the raised position so that the lower platform 80 is level with the push-off plate 16. The upper platform 78, then, is elevated above the level of the push-off plate 16 and the marshalling table 22. In a preferred embodiment of the invention a second pair of platforms 82,84 are also carried by housing 60, so that the apparatus can be alternately used on either modular brick or king-size brick. The second set of platforms 84,82 are carried on a common support frame 86 which is pivotally mounted between plates 62, and may be adjusted by rotating the support frame 180° so that the platforms 82,84 are placed on top on a level with the push-off plate 16 and marshalling table 22 in the same manner as described hereinabove.

MARSHALLING TABLE AND SHUTTLE SYSTEM

Figure 4:
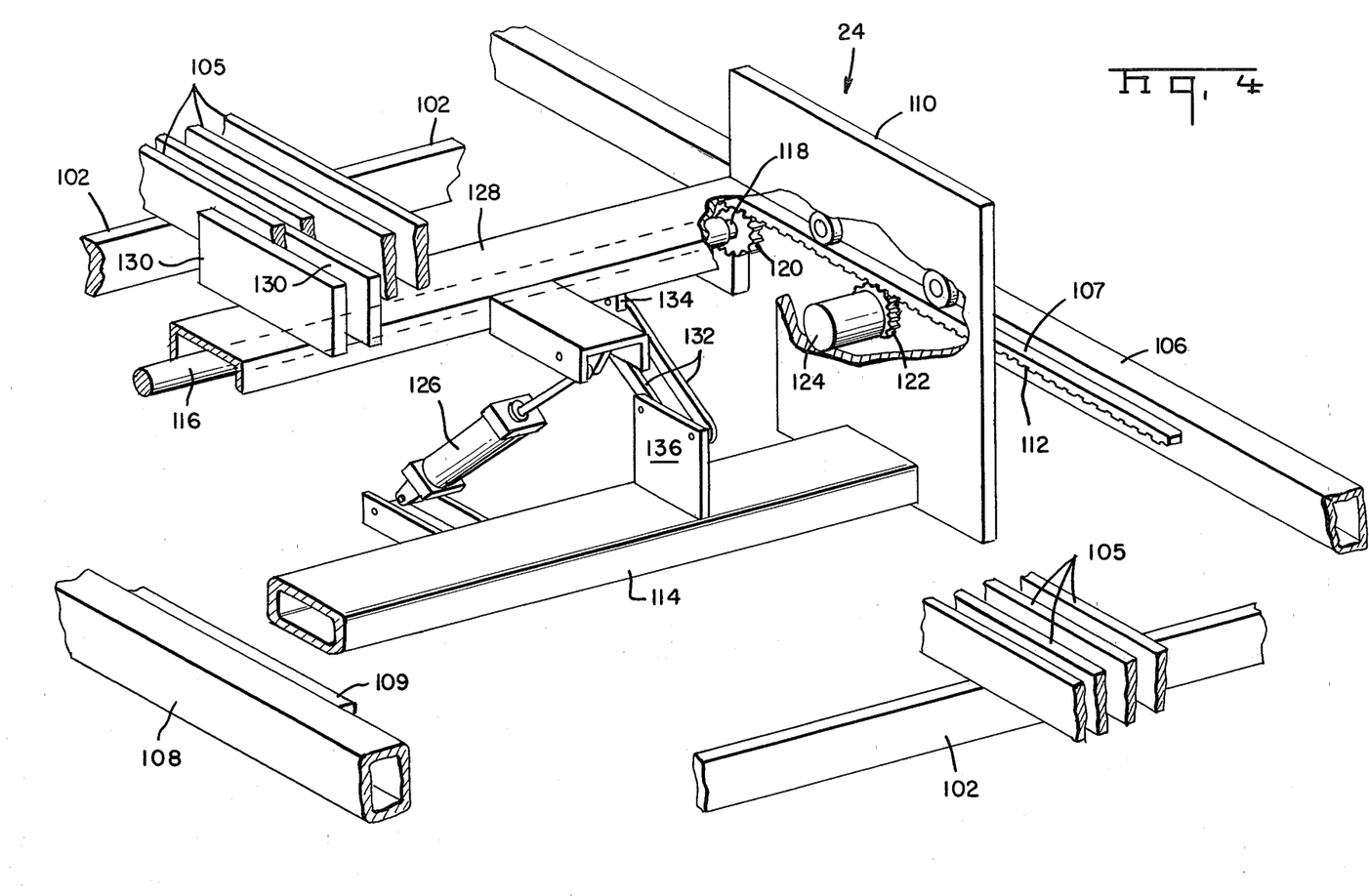
FIG. 4 is an enlarged perspective view of the marshalling table.
Figure 5A:
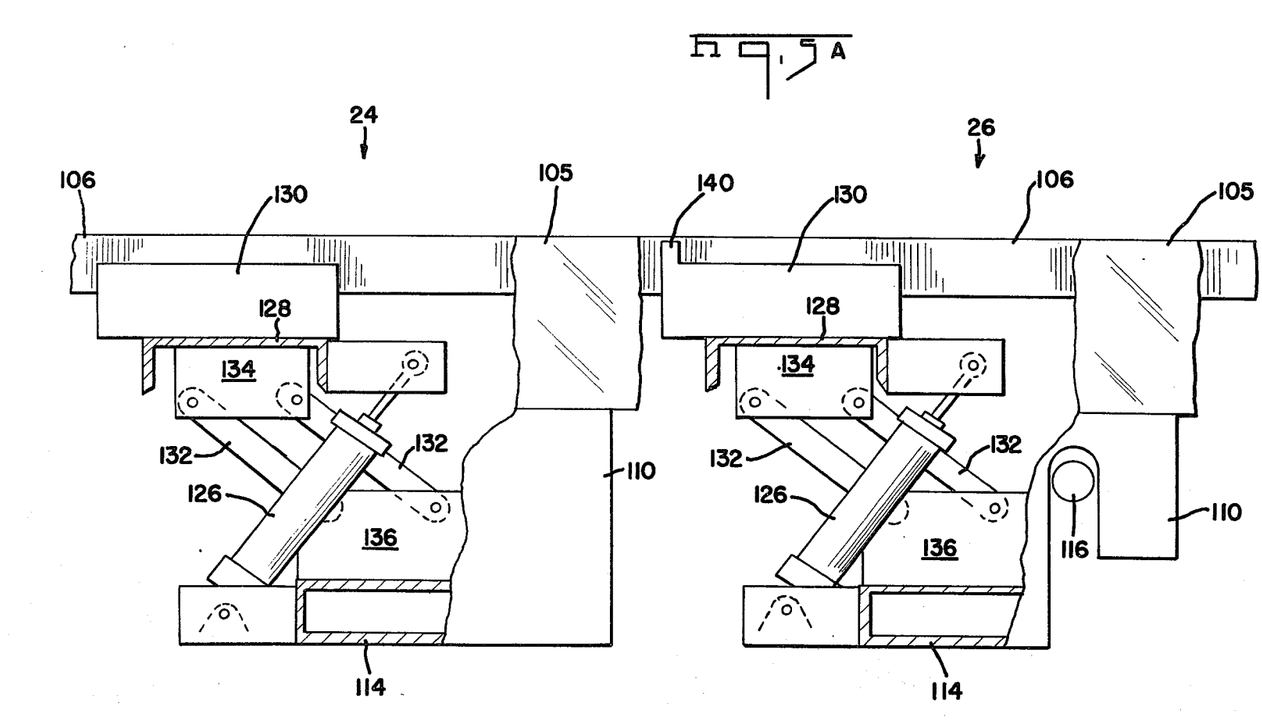
FIGS. 5A and 5B are enlarged side views respectively illustrating the shuttles of the marshalling table in a first and second position.
Figure 5B:
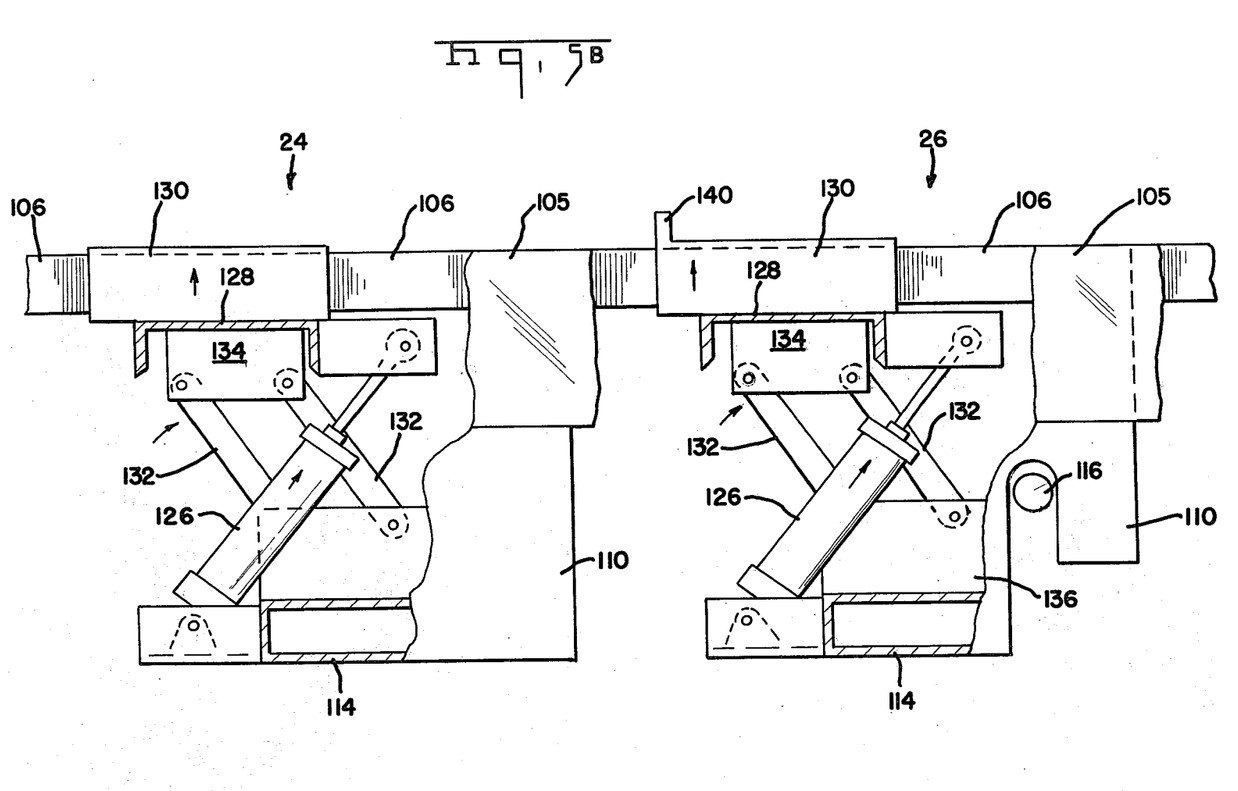

Turning now to FIGS. 4 and 5, there is illustrated the unique marshalling table and shuttle system according to the present invention. First of all the marshalling table includes a plurality of laterally spaced, longitudinally extending stationary bars 105 extending between cross members 102,104 which extend between the side rails 106,108. The bars 105 form the platform upon which the bricks are preferably initially placed as they are delivered from the aforedescribed elevator means 20. Alternatively the bricks might be placed onto the bars 130 of the shuttle 24 (see below). Once the bricks are in place it is necessary to move the double layer stack into position beneath the inverter head 28. For this purpose a shuttle means 24 is to be hereinafter described. As has been noted hereinabove, there are actually two shuttle means, one to move the bricks from the initial end of the marshalling table 22 into position beneath inverter 28 and the other to simultaneously move the faced bricks from beneath the inverter 28 into position on the setting table. The first or stacker shuttle means 24 will be described below in detail.

A pair of side support plates 110 are mounted for longitudinal movement along tracks or flanges 107,109 of side rails 106,108. In this regard the underneath surface of rails or flanges 107,109 include teeth 112 which connect tracks 107,109 with a motive force for moving shuttle 24 therealong.

A cross member 114 in the form of an inverted U-shaped channel member extends between and connects the two side plates 110. Additionally, a shuttle stabilizer bar 116 extends between the two side plates 110 and is supported in bearing relation thereto for rotation relative thereto. At one end of the stabilizer bar 116 is mounted thereon a wheel member 118 which includes a plurality of peripheral teeth 120 which in turn engages the underneath tooth portion of rail 107. A second toothed member or gear 122 is mounted on plate 110 with the teeth thereof in operative engagement with the teeth 112 of flange 107. A drive motor 124 is attached to the shaft which holds this gear 122. Upon activation, the drive motor causes the shuttle 24 to move back and forth along rail 107. It should be apparent that the drive motor 124 is a reversible motor capable of driving the shuttle 24 in either direction. A pair of hydraulic cylinders 126 (one being shown in FIG. 4) have the base ends thereof mounted at spaced positions along stabilizer beam 114. The free ends of the pistons of hydraulic cylinders 126 are connected to a floating support bar 128 which extends across the majority of the distance between side plates 110, however, does not engage the side plates. A plurality of longitudinally extending, transversely spaced stabilizer bars 130 are attached to and supported by beam 128. The bars 130 are so positioned along beam 128 that they are in between the openings between the aforementioned longitudinally extending bars 105 which form the marshalling table. As the hydraulic cylinder is activated and deactivated, it can be seen that the bars 130 move from a lower position beneath the level of bars 105 to an uppermost position where they are above the level of bars 105. Therefore, any bricks or other items which are resting on bars 105 will be lifted upon activation of hydraulic cylinder 126 to raise the support beam 128.

In connection with the operation of cylinders 126, support links 132 connect a bracket 134 on the underneath side of support beam 128 with a second bracket 136 which extends upwardly from the upper surface of cross member 114. The two stabilizing links 132 provide support and guidance for the vertically movable support beam 128 as it is lifted and lowered by the hydraulic cylinders 126 (see FIGS. 5A and 5B).

The facer shuttle 26 which is the shuttle which removes the faced bricks from a position beneath the inverter 28 and carries them to a point for advancement by puller bar is substantially identical with the stacker shuttle 24. The only substantial difference in the two shuttles is that the facer shuttle 26 carries a plurality of upstanding lugs 140 (FIG. 5B) on the upstream end of the vertically movable bars 130'. The purpose of lug 140 is that the bricks being moved from the position beneath the inverter must push against bricks downstream into position on the downstream end of the marshalling table. In order to exert the horizontal force necessary it is essential that the lugs be provided on this shuttle. To the contrary on the stacker shuttle 24, there is no horizontal force necessary to push against anything, therefore the lugs are not needed. The hydraulic cylinders for the facer shuttle 26 lower the bars 130' sufficiently so that the lugs 140 are beneath the level of the bars 105 on the marshalling table during the return of the shuttle upstream to the position beneath the inverter.

INVERTER/FACER ASSEMBLY

Figure 6:
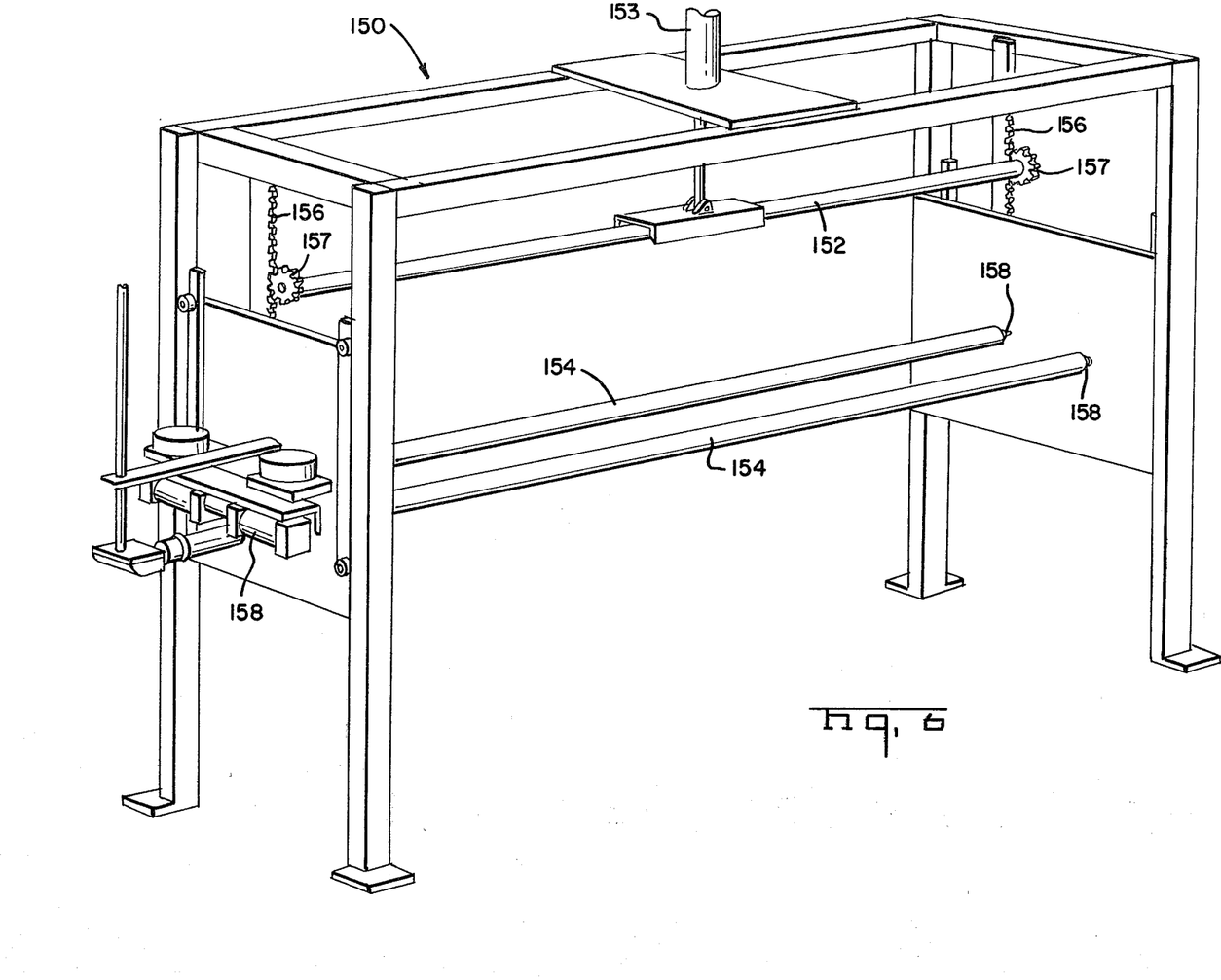
FIG. 6 is an enlarged perspective view of the inverter apparatus alone.

Turning now to FIG. 6 there is illustrated the inverter device 28 in more enlarged detail. Generally there are various types of inverters or facers commerciallyavailable on the market which will operate to lift an upper row or plurality of rows of bricks, turn them 180° around a horizontal axis and replace them upside down on the lower layer. Therefore it is felt that a detailed discussion of such a type of inverter is not necessary as the specific inverter or facer 28 utilized is not critical to this invention.

One type of inverter that will operate satisfactorily is illustrated in FIG. 4 and includes a frame 150 which straddles the marshalling table 31. A vertically reciprocal carriage 152 is supported by frame 150 and extends transversely across the area above the marshalling table 31. One or more hydraulic cylinders 153 support the carriage from frame 150 and provide a means for driving it up and down in vertical movement. A brick gripping assembly is pivotally attached by bearings 158 to carriage 152. The gripping assembly includes pressure plates, air bags or other gripping type means 154 which extend across the opposite ends of the bricks and are activated in a well known manner to grip and lift the bricks as the carriage 152 is lifted. For stabilizing the carriage 152 in its vertical movement, a gear rack 156 is provided on either side of frame 150 and a cooperating gear or roller 157 is attached to the carriage for following the gear rack up and down in a vertical movement. A hydraulic rotary actuator 158 is so connected to the pivot shaft 158 as to cause it to rotate 180° upon receipt of a signal indicating that the gripping members have effected the gripping operation and that the carriage 152 is being lifted.

SEQUENCE OF OPERATION

Figure 7:
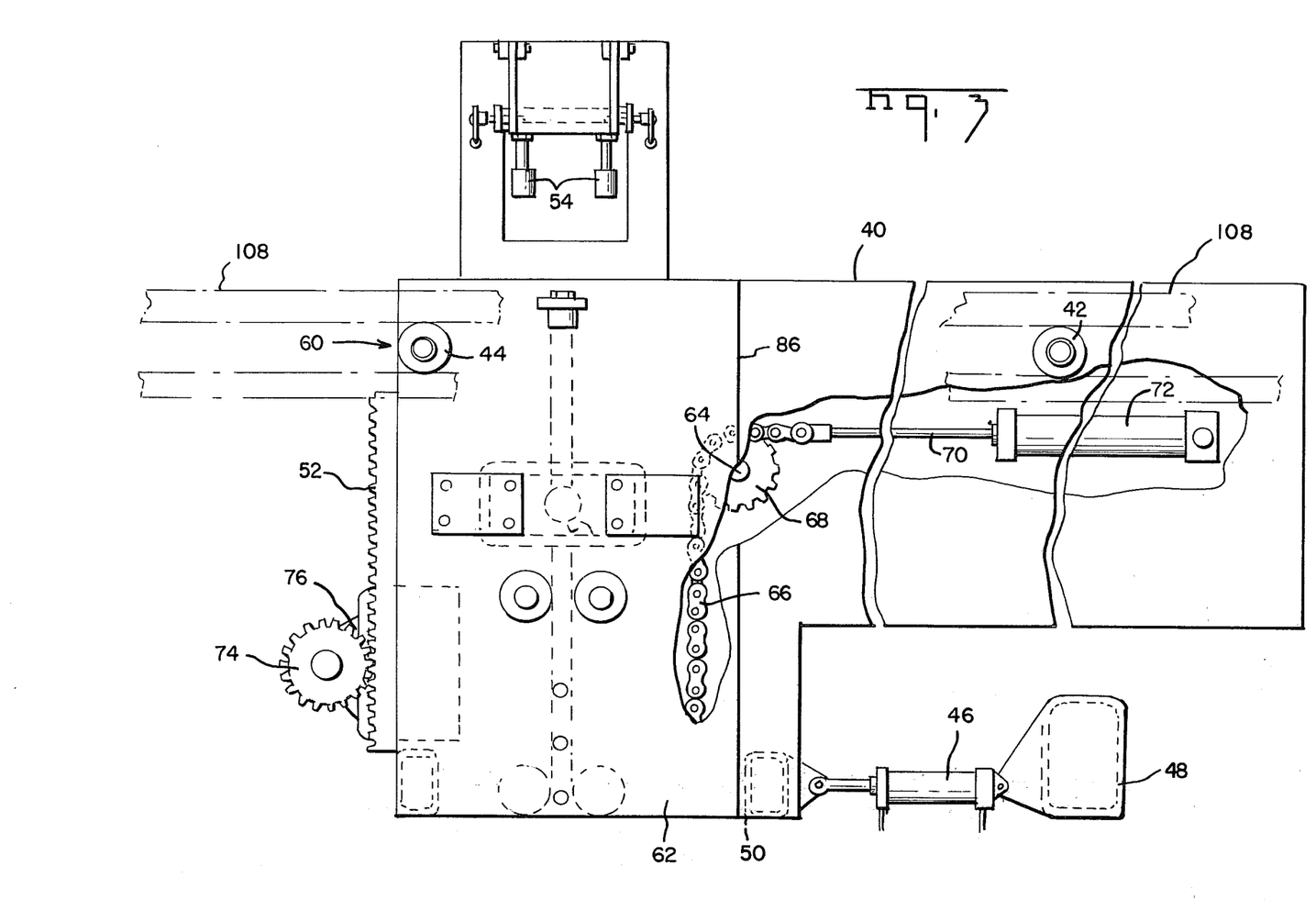
FIGS. 7A–F schematically illustrate the brick movement through the system at successive stages of operation.

Turning now to FIG. 7 there is schematically illustrated the processing of bricks through the unique stacker/facer system. By way of orientation FIG. 7a illustrates the system arranged so that each layer of bricks being processed include two rows. The rows are numbered for purposes of clarification. In FIG. 7a rows 1-4 have been faced by facer 28 and are in position therebeneath. Rows 5-8 have been placed on the front end of marshalling table 22, and rows 9 and 10 have been moved into position on the lower platform of stacker 20. Rows 11-16 are progressing along the push-off table, and row 17 has just reached the end of the off-bearing conveyor 10.

In the first move of the entire system, the facer shuttle 26 moves rows 1-4 down to a spaced position on table 29. Rows 5-8 are moved by the stacker shuttle 24 into position beneath the facer which lowers around the upper layer comprised of rows 7 and 8. Stacker 20 lowers so that rows 9 and 10 are beneath the level of the marshalling table 22 and the upper platform 78 of the stacker is on a level with marshalling table 22. Row 17 has been moved by push-off mechanism 12 to a position on the front end of the push-off table, however, is not pushed far enough to move the entire rows 11-16. A new row 18 moves into position at the terminal end at the off-bearing conveyor 10.

If the next step shown in FIG. 7c, facer shuttle 26 returns to its position beneath the facer. During this time it should be noted that the lugs 140 are lowered beneath the level of marshalling table 22 so as not to engage rows 5 and 6 during the return. The facer 28 is lifting and inverting rows 7 and 8. Stacker shuttle 24 is returned to its initial position beneath the front end of the marshalling table 22. Rows 11 and 12 are moved from the push-off table 16 onto the upper platform 78 of stacker 20 by the push-off mechanism 12. A new row 19 is now in place at the end of the off-bearing conveyor 10.

In the step illustrated in FIG. 7d, rows 7 and 8 are placed back down atop rows 5 and 6, upside down from their original position (faced). Stacker 20 is moved back to its uppermost position so that lower platform 80 is aligned with marshalling table 20. Row 19 is moved off of the off-bearing conveyor onto the push-off table, however, is not moved far enough by push-off mechanism 12 to exert any forward movement of the remainder of the row 13-18 at this time.

Finally, in FIG. 7e, rows 9-12 are moved onto the front end of the marshalling table by a combination of the effect of the push-off mechanism 12 and the cooperating push device 18. As rows 11 and 12 are pushed off the upper platform 78 they assume a position on top of rows 9 and 10. In order to effect this maneuver, it is necessary that the push-off mechanism 12 and the auxiliary pushing device 18 are so synchronized that they move together, starting at the same time and at the same speed. Next rows 13 and 14 then become emplaced on lower platform 80 and the operation sequence or cycle has been completed for one step. It will be seen as in the next step that as rows 5-8 are moved onto the front end of a setting table or marshalling conveyor, they will push against rows 1-4 to move them progressively further onto the setting table. The operation of the setting table as it accumulates and separates columns of brick for movement by the setting 30 to a kiln car is a conventional operation and not the subject of this application.

It should be understood that suitable electronics, such as limit switches and other electronic sensing devices, and counters are suitably selected and mounted to operate the machine in accordance with the desired program of operation. Since such electronics are well known they have not been described herein in order to simplify the understanding of this machine. Also while hydraulic cylinders are the preferred actuators, others might be employed.

While a detailed description of the drawing has been discussed hereinabove it is apparent that various changes and modifications might be made to the system without departing from the scope and intent of the invention which is set forth in the claims below.

What is claimed is:

1. An apparatus for stacking single layer rows of bricks or similar articles received from a push-off table into multi-layer rows and inverting the upper course thereof comprising:
   (a) an elevator means having a first platform onto which a first row of bricks are moved, a second platform in vertical spaced relation to said platform onto which a second row of bricks are placed;

(b) said elevator means further including a lifting means for moving said platforms between a first vertical position in which said first platform is aligned with and receives said first row of bricks and a second vertical position in which said second platform is aligned with and receives said second row of bricks;

(c) a marshalling table adjacent to and downstream from said elevator means for receiving a double row stack of brick therefrom;

(d) transfer means for moving bricks from said elevator means onto the upstream end of said marshalling table;

(e) first shuttle means for transferring said double row stack between a first horizontal position on the upstream end of said marshalling table and a second horizontal position downstream therefrom;

(f) an inverter means positioned at said second horizontal position of said double row stack for lifting and inverting the uppermost of said rows.

2. The apparatus according to claim 1 wherein said elevator means includes a vertically movable housing connected to said lifting means, said housing including a pair of spaced side plates supporting said first and second platforms, said side plates further connected to said lifting means for effecting the vertical movement of said platform.

3. The apparatus according to claim 2 wherein said lifting means comprises a pair of horizontally mounted linear actuators connected to said side plates through a flexible connecting member, whereby horizontal movement of the linear actuator causes vertical movement of said elevator means.

4. The apparatus according to claim 1 and further including a shifting means for making horizontal movements of said elevator means between a first receiving position with the platforms adjacent the end of said push-off table and a second discharge position spaced slightly therefrom.

5. The apparatus according to claim 1 wherein said transfer means includes a first push-off means which engages the bricks on the push-off table and urges them against the bricks on the lower platform, and a second push-off means which engages the brick on the upper platform, both push-off means operating simultaneously to transfer the upper and lower rows of bricks from the elevator onto said marshalling table in stacked relationship.

6. The apparatus according to claim 1 and further including a second shuttle means for transferring said double row stack away from said second position simultaneously with the delivery of another double row stack to said second position.

7. A machine for cutting and setting extruded slugs of unfired brick comprising:

(a) conveying means for delivering said slugs to a cutting area;

(b) means for pushing said slugs transversely to their longitudinal axis through a wire cutter means;

(c) elevator means downstream of said cutter means for receiving said slugs, said elevator means including a pair of vertically spaced platforms, means for lifting and lowering said elevator means whereby alternate slugs are delivered to one of said platforms to form two layers of rows;

(d) an inverter means downstream from said elevator means for lifting and inverting the uppermost layer;

(e) transfer means for shifting the two layers of rows from said elevator means to said inverter means;

(f) setter means downstream of said inverter means for transferring double layer courses of bricks onto an awaiting kiln car.

8. Method of cutting and arranging unfired bricks in preparation for setting onto a kiln car comprising the steps of:

(a) passing slugs of unfired clay sidewise through a wire cutter one layer at a time to form successive, adjacent, abutting single layer rows of cut brick;

(b) forming a spaced double layer stack by lowering one row then moving a succeeding row into superposed relation in spaced relation above said first row;

(c) transferring both layers in said sidewise direction from said superposed spaced relation into superposed engaging relation by pushing both layers simultaneously in said sidewise direction;

(d) lifting and inverting the upper layer of said double layer stack to effect a facing operation.

9. The method according to claim 8 wherein in step (b) said one row is spaced slightly from said abutting relation to said succeeding row, then returned to said abutting relation prior to the movement of the succeeding row into superposed relation.

10. Apparatus for stacking single-layer rows of unfired brick into double layers comprising a push-off table along which adjacent, abutting rows of bricks proceed sidewise to the end thereof; an elevator means positioned adjacent the end of said table and including a pair of spaced platforms comparable in size and shape to at least one of said rows of cut, unfired brick; lifting means for alternately positioning one of said platforms on a horizontal level with said push-off table, whereby alternate single rows of said cut, unfired brick are transferred onto one of said platforms in superposed relation; transfer means for simultaneously pushing said superposed rows out of said elevator means into a marshalling table in overlying relation with the upper layer resting on the lower layer in superposed relation; and a shifting means for making horizontal movement of said elevator means between a first receiving position with the platforms adjacent the end of said push-off table and a second discharge position spaced slightly therefrom.

* * * * *